Aug. 28, 1962  H. F. NITKA  3,051,837
RADIATION DETECTION AND WARNING LABEL
Filed Aug. 26, 1957

INVENTOR.
HEINZ F. NITKA
BY
ATTORNEYS

United States Patent Office

3,051,837
Patented Aug. 28, 1962

---

3,051,837
RADIATION DETECTION AND WARNING LABEL
Heinz F. Nitka, Binghamton, N.Y., assignor to General Aniline & Film Corporation, New York, N.Y., a corporation of Delaware
Filed Aug. 26, 1957, Ser. No. 680,257
3 Claims. (Cl. 250—83)

This invention relates to a radiation detector and, more particularly, to a detector in the form of a label for application to a substance being irradiated, which label gives a visual indication of the dosage of radiation to which the substance has been subjected.

The use of detectors in the form of labels or the like has been proposed and used for measurement of low dosages of radiation as in monitoring services for the protection of personnel. The extremely high response to radiation of photographic film makes it unusable as a dosage indicator in the field of mega-roentgen dosimetry. Mega-roentgen dosimetry is used in large-scale food sterilization procedures. It is to this particular field, namely, mega-roentgen dosimetry, in which the colorimetric indicator of this invention has particular utility.

It is, therefore, an object of this invention to provide a colorimetric radiation indicator or detector for giving a visual indication of the radiation dosage to which a substance to which this indicator is attached has been subjected.

Other objects and features will be apparent from the following description of the invention, pointed out in particularity in the appended claims, and taken in connection with the accompanying drawings, in which:

FIG. 2 is a top plan view showing a plurality of the indicators of this invention carried by a longitudinal web of adhesive tape, or the like.

FIG. 3 is a view taken along line 3—3 of FIG. 2.

Figure 1:
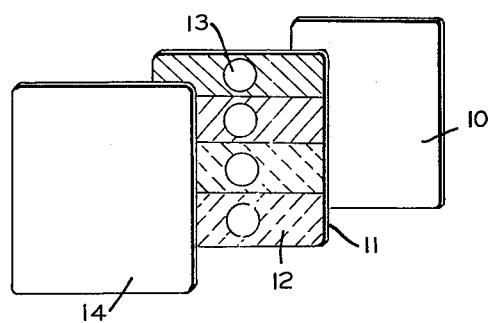
FIG. 1 is an exploded perspective view of the indicator which is the subject matter of this invention.

Referring to FIG. 1, numeral 10 indicates a photographic high-speed print-out paper which has the capacity of changing color to a degree which is a function of the dosage of radiation impinging thereon. Print-out papers having a high-speed print-out emulsion are commercially obtainable. Their speed is measured relative to commercial proof paper and is approximately seventy times greater. High-speed print-out emulsions for coating paper or other base are described in U.S. application S.N. 509,111, filed May 17, 1955, now Patent No. 2,888,347, and in Photo. Eng. 1954. On the backside of this paper material may be applied an adhesive composition to permit the attachment of the indicator in the form of a label as shown in FIG. 1 to the substance being irradiated. Reference character 11 indicates a comparison member in the form of a step wedge. This member is positioned between the source of radiation and the print-out paper 10. The comparison member is divided into a plurality of discrete areas 12. Each of these areas has a shade of color substantially similar to the shade assumed by the print-out paper upon being subjected to a specific density of radiation. For instance, the topmost discrete area may have a shade of color identical with that of the print-out paper before said paper is irradiated. The next section may have a shade of color substantially similar to the color assumed by the print-out paper after being irradiated by radiation yielding a density of 0.2. The next discrete area indicates a density of 0.5. The last radiation area indicates a density of 0.8. All of these figures express density relative to baryta-coated paper base as zero density. There may be any number of discrete areas as it is a matter of choice as to what density said areas represent.

Each of the discrete areas of the wedge 11 has a perforated portion indicated by the reference character 13. The assembly of the wedge and the print-out paper provides a colorimetric indicator whereby indications of varying degrees of radiation density are visually apparent. If the substance to which the label is attached has been irradiated by a specific dosage of radiation, this dosage may be determined by comparing the color appearing in the perforations 13 with the colors of the various discrete areas of the wedge. By choosing the discrete area having a color most similar to that assumed by the print-out paper, as apparent through perforations in the wedge, the dosage of radiation in question can be easily determined.

Reference character 14 indicates a filter material which is positioned between the wedge and the source of radiation to protect the assembly from printing out due to light exposure. For instance, this filter might be a light orange gelatin filter (Wratten No. 22).

Figures 2, 3:
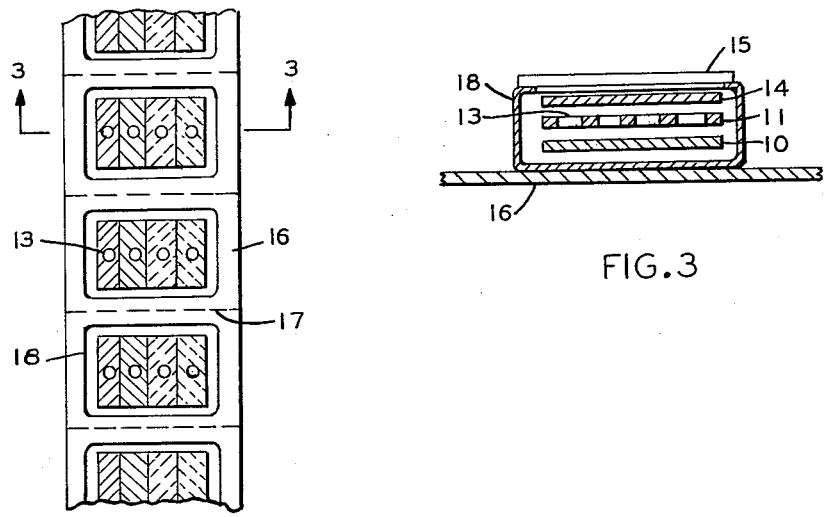

Referring to FIGS. 2 and 3, there is illustrated an assembly of a plurality of these indicators in the form of labels. Except for the window provided for visual evaluation, which window may be formed by some gelatin substance indicated by reference character 15 in FIG. 3, the assembly is enclosed in a wrapping material 18 impervious to light, such as a polyethylene-coated aluminum foil or a black borax coated straw paper. This preserves the storage stability and prevents light leakage from the edges of the assembly. A plurality of these assemblies may be positioned on an adhesive tape 16 in the form of a web. The web has a plurality of discrete areas separated by a perforated web portion 17. Each of the detectors is positioned in a separate one of these discrete areas. This offers a convenient means for packaging a plurality of the label-type detectors of this invention. This web may be rolled up for space saving in packaging and shipping.

From the above, it is apparent that the labels, by virtue of the adhesive backing, may be attached to the substance to be irradiated, such as cans, cartons, etc., before the substances undergo irradiation for sterilization. After irradiation, the labels are visually evaluated in situ and discarded.

What has been described is one embodiment of the present invention. Other embodiments, obvious from the teachings herein to those skilled in the art, are contemplated to be within the spirit and scope of the following claims.

I claim:

1. A radiation indicator in the form of a strip of flexible material with an adhesive backing having a plurality of detachable elements, each of said elements when detached and affixed by means of said adhesive to goods subjected to radiation serving as a radiation indicating label, each of said labels consists of a layer of radiation sensitive material capable of visually changing color to a degree, which is a function of the extent of radiation impinging thereon, said color change taking place solely due to said radiation and without chemical processing, a color comparison member overlying said radiation-sensitive layer, said member being divided into a plurality of discrete areas, each of said areas having a shade of color substantially similar to that shade assumed by said radiation-sensitive material upon being subjected to a specific dosage of radiation, each of said areas having a different shade of color, and each of said areas having at least one perforation therein through which the shade of color of said radiation-sensitive material may be observed.

2. An indicator as defined in claim 1, further including a sheet of light filter material overlying said comparison member.

3. An indicator as defined in claim 1 wherein said radiation-sensitive material is a photographic high-speed print-out paper.

References Cited in the file of this patent

UNITED STATES PATENTS

| | | |
|---|---|---|
| 2,258,593 | Black | Oct. 14, 1941 |
| 2,483,991 | Wallon | Oct. 4, 1949 |
| 2,496,218 | Kieffer | Jan. 31, 1950 |
| 2,614,430 | Ballard et al. | Oct. 21, 1952 |
| 2,659,013 | Danis et al. | Nov. 10, 1953 |
| 2,680,816 | Stern | June 8, 1954 |
| 2,687,478 | Land | Aug. 24, 1954 |
| 2,738,429 | Goldblith | Mar. 13, 1956 |
| 2,789,232 | Block | Apr. 16, 1957 |

OTHER REFERENCES

An Easy to Make Film Badge Holder, by Frisoli et al., Nucleonics, October 1952, pages 62, 63.